Patented Nov. 21, 1922.

1,436,290

UNITED STATES PATENT OFFICE.

FREDERICK BELDING POWER, OF WASHINGTON, DISTRICT OF COLUMBIA, AND VICTOR KING CHESNUT, OF HYATTSVILLE, MARYLAND, DEDICATED, BY MESNE ASSIGNMENTS, TO THE PEOPLE OF THE UNITED STATES.

SYNTHETIC APPLE OIL.

No Drawing. Application filed October 12, 1922. Serial No. 594,141.

(FILED UNDER THE ACT OF MARCH 3, 1883, 22 STAT. L., 625.)

*To all whom it may concern:*

Be it known that we, FREDERICK B. POWER and VICTOR K. CHESNUT, citizens of the United States of America, and employees of the Department of Agriculture, residing in Washington, District of Columbia, and Hyattsville, Maryland, respectively (whose post-office address is Department of Agriculture, Washington, D. C.), have invented an Improved Synthetic Apple Oil.

This application is made under the act of March 3, 1883, chapter 143 (22 Stat., 625), and the invention herein described and claimed may be used by the Government of the United States or any of its officers or employees in the prosecution of work for the Government, and by any person in the United States, either in public or private work, without payment to us of any royalty thereon.

We have found that the odorous constituents of the apple include in addition to the combination of substances described in Patent Number 1,366,541, issued to us under date of January 25, 1921, which substances are the amyl esters of formic, acetic, caproic, and caprylic acids, together with acetaldehyde, also a very small amount of the aliphatic terpene alcohol known as geraniol, $C_{10}H_{18}O$. This substance may be considered to exist both in the free state and in the form of its esters, and it imparts to the apple a distinctive fragrance. Although contained in very small proportion in the most fragrant varieties of the fruit, it is believed to be a constituent of all apples.

Geraniol or its esters has been found to modify to a considerable degree the odor of our synthetic apple oil and to materially enhance its fragrance, thus enabling us to reproduce more truly and completely the natural ordor of the choicest apples.

On the basis of our recent discoveries we have now prepared a new synthetic apple oil which has the following composition:

| | Parts. |
|---|---|
| Iso-amyl ester of formic acid | 10 |
| Iso-amyl ester of acetic acid | 10 |
| Iso-amyl ester of normal caproic acid | 5 |
| Iso-amyl ester of normal caprylic acid | 1 |
| Acetaldehyde | 2 |
| Geraniol | 1 |
| Geranyl ester of formic acid | 1 |
| Geranyl ester of acetic acid | 1 |

The above-mentioned constituents are given in parts by volume, and they should be employed in the purest possible state.

It has been found that a satisfactory synthetic apple oil may be produced by omitting from the above combination of ingredients the isoamyl ester of normal caprylic acid. Its addition, however, is desirable.

The above-mentioned combination, which is not restricted to the exact proportions indicated, may be employed for flavoring purposes either in its concentrated state or in the form of a solution in pure ethyl alcohol, in a mixture of alcohol and glycerin, and with alcohol solutions of certain organic acids, such as citric and tartaric acids, or it may be brought into the form of an emulsion with certain fatty oils, especially such as have the least tendency to become rancid on keeping.

We claim:

1. A synthetic apple oil consisting of the amyl esters of formic, acetic, caproic, and caprylic acids, acetaldehyde, geraniol, geranyl formate and geranyl acetate.

2. A synthetic apple oil consisting of the amyl esters of formic, acetic, and caproic acids, acetaldehyde, geraniol, geranyl formate and geranyl acetate.

In testimony whereof, we affix our signatures in the presence of two subscribing witnesses.

FREDERICK BELDING POWER.
VICTOR KING CHESNUT.

Witnesses:
J. J. LOVE, JR.,
JOSEPH COHEN.